US012605302B2

(12) United States Patent
Niu

(10) Patent No.: US 12,605,302 B2
(45) Date of Patent: Apr. 21, 2026

(54) MASSAGER CAPABLE OF SWELLING THROUGH VIBRATION

(71) Applicant: Liqing Niu, Dongguan (CN)

(72) Inventor: Liqing Niu, Dongguan (CN)

( * ) Notice: Subject to any disclaimer, the term of this patent is extended or adjusted under 35 U.S.C. 154(b) by 841 days.

(21) Appl. No.: 18/046,960

(22) Filed: Oct. 17, 2022

(65) Prior Publication Data

US 2024/0122789 A1 Apr. 18, 2024

(51) Int. Cl.

*A61H 19/00* (2006.01)
*A61H 21/00* (2006.01)
*A61H 23/02* (2006.01)

(52) U.S. Cl.

CPC ............. *A61H 19/44* (2013.01); *A61H 21/00* (2013.01); *A61H 23/0254* (2013.01); *A61H 2201/1246* (2013.01); *A61H 2201/169* (2013.01); *A61H 2201/503* (2013.01)

(58) Field of Classification Search

CPC ........ A61H 19/00; A61H 19/40; A61H 19/44; A61H 21/0023; A61H 23/0254

See application file for complete search history.

(56) References Cited

U.S. PATENT DOCUMENTS

2009/0177029 A1* 7/2009 Alilovich ........... A61H 23/0254 600/38
2013/0131772 A1* 5/2013 Peddicord .............. A61H 19/00 607/138

FOREIGN PATENT DOCUMENTS

CN 212282141 U 1/2021
CN 212466548 U 2/2021

* cited by examiner

*Primary Examiner* — Samuel G Gilbert

(57) ABSTRACT

A massager capable of swelling through vibration, including an integrated silica gel jacket, wherein an inner shell is arranged at a bottom of the silica gel jacket, a silica gel inner sleeve is arranged at a top of the inner shell, a vibrating body is arranged in the silica gel inner sleeve, a top of the vibrating body is fixed at a top of the silica gel inner sleeve, a vibrating silica gel sleeve is covered outside the vibrating body, vibrating silica gel sleevehole is connected to an air pump; when gas does not enter into the air pump, the vibrating silica gel sleeve is adhered to an inner wall of the silica gel inner sleeve; when gas enters into the air pump, the silica gel inner sleeve is opened by the gas, an air chamber is formed between the silica gel inner sleeve and the vibrating silica gel sleeve.

10 Claims, 6 Drawing Sheets

MASSAGER CAPABLE OF SWELLING THROUGH VIBRATION

TECHNICAL FIELD

The present disclosure relates to the technical field of massagers, in particular to a massager capable of swelling through vibration.

BACKGROUND

With the improvement of living standards, sexual satisfaction has also become an index for measuring people's happy life. In the face of severe practical work and social stress, couples, divorced and single men and women who cannot obtain sexual satisfaction and orgasm are often confused about the quality of sexual life, bringing great depression to physical and psychological health and spiritual psychology. Therefore, a large population of people suffers from varying degrees of sexual dysfunction. According to the domestic statistics, it has found that more than 50% of women have no orgasm in sexual life.

In order to meet the demands for sexual life, a female masturbation massager and a male prostate massager are provided.

SUMMARY

For the problem in the prior art, the present disclosure provides a massager capable of swelling through vibration, which does not reduce vibration force, prevents leakage, is not broken and ensures the airtightness.

In order to implement the above purpose, the present disclosure adopts the technical solution below:

a massager capable of swelling through vibration, including an integrated silica gel jacket (1), wherein an inner shell (2) with a shape consistent to a bottom of the silica gel jacket (1) is arranged at the bottom of the silica gel jacket (1), a silica gel inner sleeve (3) is arranged at a top of the inner shell (2), an outer wall of the silica gel inner sleeve (3) is adhered to an inner wall of the silica gel jacket (1), a vibrating body (4) is arranged in the silica gel inner sleeve (3), a top of the vibrating body (4) is fixed at a top of the silica gel inner sleeve (3), a vibrating silica gel sleeve (5) is covered outside the vibrating body (4), the vibrating silica gel sleeve (5) is in gap connection with the vibrating body (4), a bottom of the vibrating silica gel sleeve (5) is in sealing connection with a bottom of the silica gel inner sleeve (3), an air inlet and outlet channel (51) is arranged in a center of the vibrating silica gel sleeve (5), an air locking member (6) is arranged at a bottom of the air inlet and outlet channel (51), a wire hole (61) and an air hole (62) are formed in the air locking member (6), the wire hole (61) is used for a wire of the vibrating body (4) to pass through and sealed by glue, and the air hole (62) is connected to an air pump (21); when gas does not enter into the air pump (21), the vibrating silica gel sleeve (5) is adhered to the inner wall of the silica gel inner sleeve (3); and when gas enters into the air pump (21), the silica gel inner sleeve (3) is opened by the gas, so an air chamber (8) is formed between the silica gel inner sleeve (3) and the vibrating silica gel sleeve (5).

Further, the silica gel jacket (1) and the inner shell (2) are inverted T-type, a side part (11) protruding from the two sides of the silica gel jacket (1) is arranged at the bottom of the silica gel jacket (1), an air inlet and outlet hole (12) is formed in the side part (11), and a connector (13) is arranged in the air inlet and outlet hole (12).

Further, the air pump (21) is arranged in the inner shell (2) and connected to a T-joint (22), the T-joint (22) is respectively connected to the air locking member (6) and an electromagnetic valve (23), and the electromagnetic valve (23) is respectively connected to the air pump (21) and the connector (13).

Further, the vibrating body (4) includes a vibrating motor (41) as well as an upper cover sleeve (42) and a lower cover sleeve (43) that are arranged on a periphery of the vibrating motor (41), the upper cover sleeve (42) is fixedly connected to the lower cover sleeve (43), a top of the upper cover sleeve (42) is fixedly connected to the silica gel inner sleeve (3), and the lower cover sleeve (43) is inserted into the air inlet and outlet channel (51) and movably connected to the vibrating silica gel sleeve (5).

Further, the upper cover sleeve (42) is provided with a slot (44), a protrusion portion (31) that fits with the slot (44) is arranged at the top of the silica gel inner sleeve (3), and the protrusion portion (31) and the slot (44) are sealed through glue.

Further, the bottom of the vibrating silica gel sleeve (5) and the bottom of the silica gel inner sleeve (3) are sealed through the glue.

Further, a first convex-concave portion (32) is arranged on an outer wall of the bottom of the silica gel inner sleeve (3), a second convex-concave portion (33) is arranged on an inner wall of the bottom of the silica gel inner sleeve (3), a first concave-convex portion (20) is arranged on an inner wall of the top of the inner shell (2), the first concave-convex portion (20) is in fit connection with the first convex-concave portion (32), a second concave-convex portion (52) is arranged on an outer wall of the bottom of the vibrating silica gel sleeve (5), and the second concave-convex portion (52) is in fit connection with the second convex-concave portion (33).

Further, a barbed protrusion (63) is arranged outside the air locking member (6), and the protrusion (63) is clamped in the vibrating silica gel sleeve (5) and sealed through the glue.

Further, a keyboard (24) is installed at the bottom of the inner shell (2), and the bottom of the silica gel jacket (1) is provided with a through hole (14), so that the keyboard (24) is exposed outside the through hole (14).

Further, a rechargeable battery (25), a charging panel (26) and a main control circuit board (27) are also arranged in the inner shell (2), and the main control circuit board (27) is arranged correspondingly to the keyboard (24).

The present disclosure has the following beneficial effects:

(1) The integrated silica gel jacket is adopted, so that the massager has comfort grip and better use experience;

(2) The top of the vibrating body is fixed at the top of the silica gel inner sleeve, so when the vibrating body vibrates, the vibrating body always vibrates at the top of the silica gel inner sleeve no matter how much the silica gel inner sleeve is opened by the gas, thereby solving gas separation force and not reducing the vibration force of the vibrating body;

(3) The silica gel jacket is sleeved with the silica gel inner sleeve, the shape of the silica gel jacket is consistent with that of the silica gel inner sleeve, and the outer wall of the silica gel inner sleeve is adhered to the inner wall of the silica gel jacket. No matter how much the silica gel inner sleeve is opened by the gas, the silica gel rupture will not be caused due to the protection of two-layer silica gel, and users can be assured to use the massager; and (4) The air locking member is arranged at the bottom of the air inlet and outlet channel, the wire hole and the air hole that are separated from each other are formed in the air locking member, the wire hole is used for the wire of the vibrating body to pass through and sealed by the glue, so as to prevent air leakage caused by the wire passing during the air intake, and ensure the airtightness in the silica gel inner sleeve; and the silica gel inner sleeve and the silica gel jacket can keep the swelling state for a long time.

Figure 1:
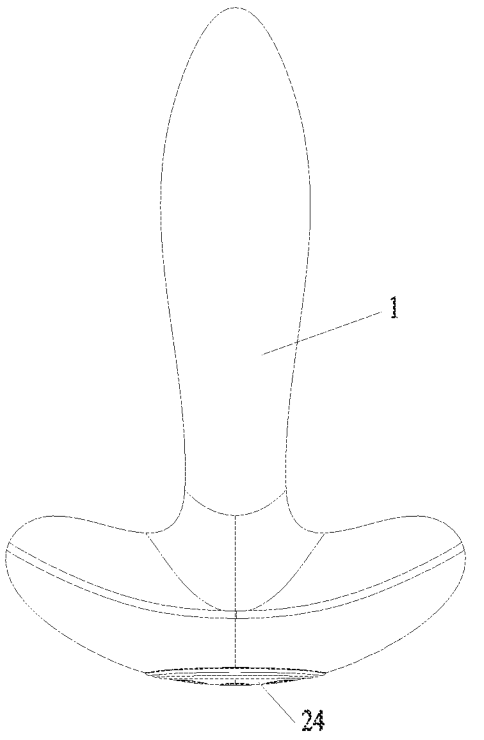
FIG. 1 is a front view of a massager capable of swelling through vibration in the present disclosure.

In the drawing, 1—Silica gel jacket, 11—Side part, 12—Air inlet and outlet hole, 13—Connector, 14—Through hole, 2—Inner shell, 20—First concave-convex portion, 21—Air pump, 22—T joint, 23—Electromagnetic valve, 24—Keyboard, 25—Rechargeable battery, 26—Charging panel, 27—Main control circuit board, 3—Silica gel inner sleeve, 31—Protrusion portion, 32—First convex-concave portion, 33—Second convex-concave portion, 4—Vibrating body, 41—Vibrating motor, 42—Upper cover sleeve, 43—Lower cove sleeve, 44—Slot, 5—Vibrating silica gel sleeve, 51—Air inlet and outlet channel, 52—Second concave-convex portion, 53—Diversion groove, 6—Air locking member, 61—Wire hole, 62—Air hole, 63—Protrusion, 7—Gap, 8—Air chamber.

DETAILED DESCRIPTION OF THE EMBODIMENTS

The technical solutions in the embodiments of the present disclosure are clearly and completely elaborated below in combination with the drawings. It is apparent that the described embodiments are only a part of the embodiments of the present disclosure but not all. Based on the embodiments of the present disclosure, all the other embodiments obtained by those of ordinary skill in the art on the premise of not contributing creative effort should belong to the protection scope of the present disclosure.

It is to be noted that directional indication (such as: upper, lower, left, right, front, rear, etc.) is involved in the embodiments of the present disclosure is merely used to explain the relative position relation, movement and the like of various components under a certain special posture (as shown in the drawings); and if the special posture is changed, the directional indication will change accordingly.

Figure 2:
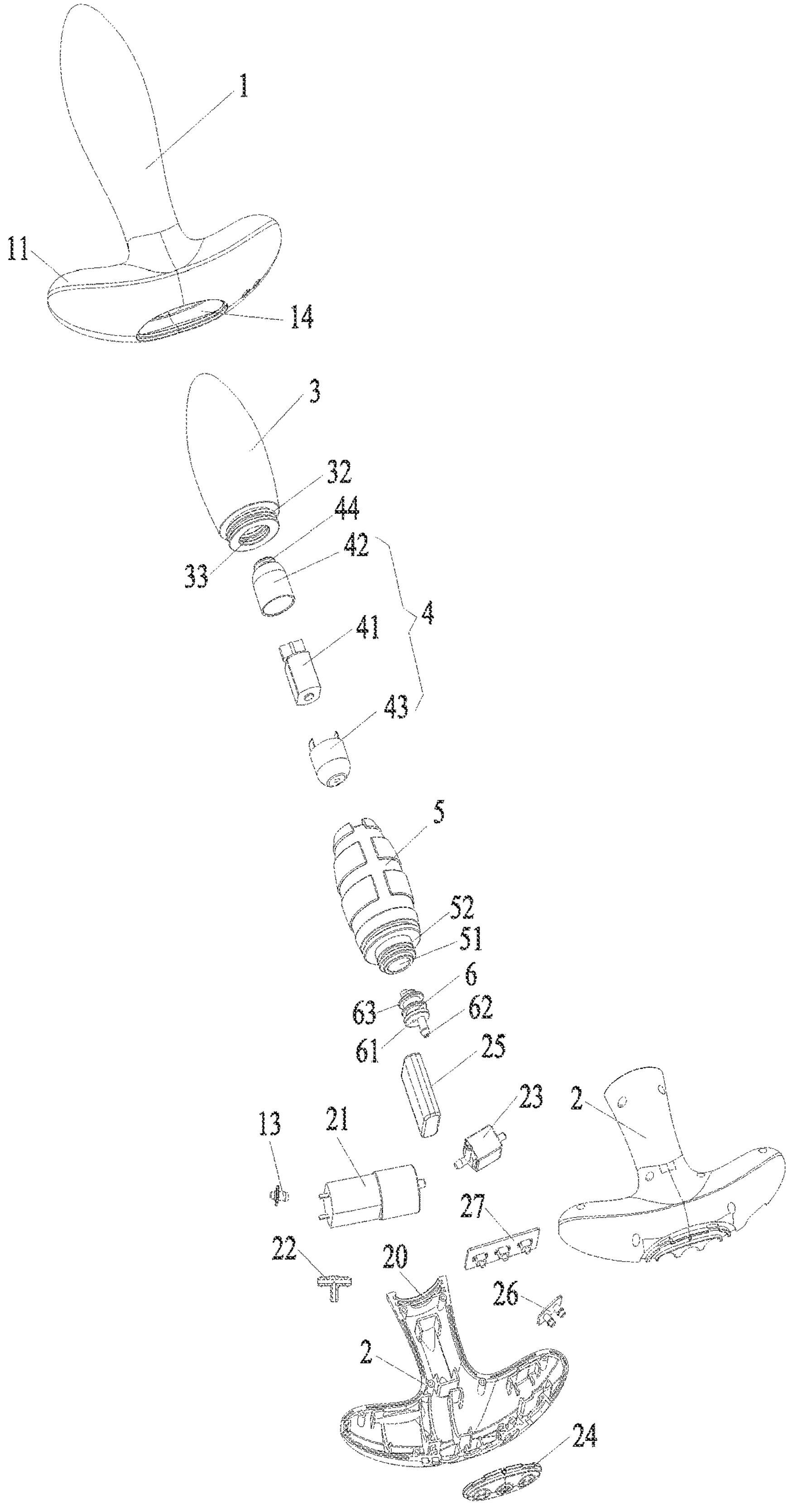
FIG. 2 is a solid decomposition diagram of a massager capable of swelling through vibration in the present disclosure.

As shown in FIG. 1 and FIG. 2, the present disclosure provides a massager capable of swelling through vibration, which is used for female masturbation or male prostate massage. The massager includes an integrated silica gel jacket 1, which enables the massager to have comfort grip and better use experience; and made of silica gel materials, the massager is softer and will not harm female and male bodies.

An inner shell 2 with a shape consistent to a bottom of the silica gel jacket 1 is arranged at the bottom of the silica gel jacket 1, so in this embodiment, the silica gel jacket 1 and the inner shell 2 are inverted T-type, a side part 11 protruding from the two sides of the silica gel jacket 1 is arranged at the bottom of the silica gel jacket 1, and the whole massager is inverted T-type, so it is more convenient to hold. An air inlet and outlet hole 12 is formed in the side part 11, and a connector 13 is arranged in the air inlet and outlet hole 12. The silica gel inner sleeve 3 is arranged at the top of the inner shell 2, the shape of the silica gel inner sleeve 3 is consistent with the shape of the upper half part of the silica gel jacket 1, and the inner wall of the silica gel inner sleeve 3 is adhered to the inner wall of the silica gel jacket 1, so as to vibrate or swell together. The silica gel jacket 1 is sleeved with the silica gel inner sleeve 2, and the shape of the silica gel jacket 1 is consistent with that of the silica gel inner sleeve 2, so no matter how much the silica gel inner sleeve 3 is opened by the gas, the silica gel rupture will not be caused due to the protection of two-layer silica gel. Similar to a tire and a tube of a bicycle, the silica gel jacket 1 and the silica gel inner sleeve 2 can ensure no burst, so users can be assured to use the massager.

Figure 3:
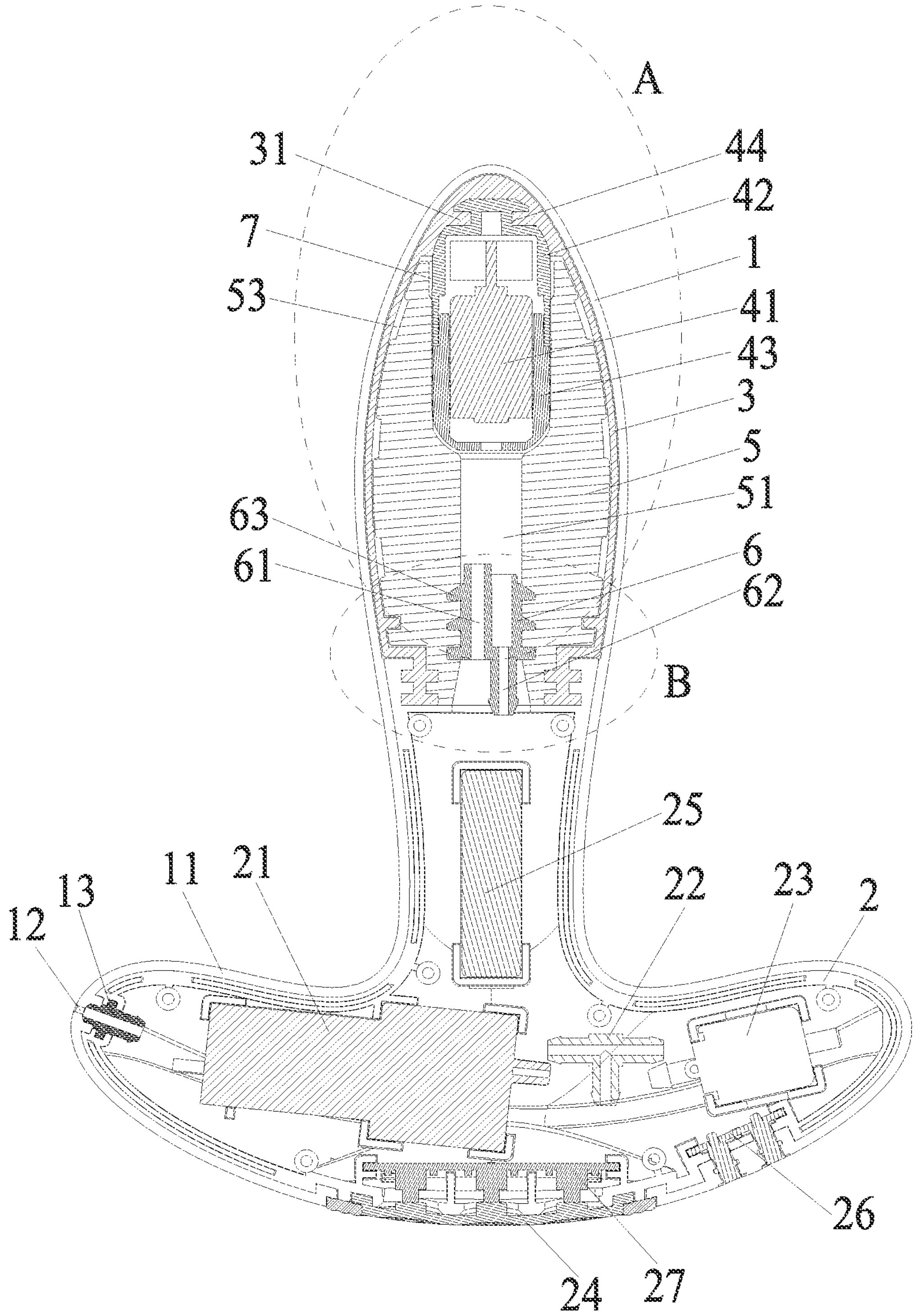
FIG. 3 is a section view of a massager capable of swelling through vibration in the present disclosure, wherein a dotted line A indicates a part capable of swelling.
Figure 4:
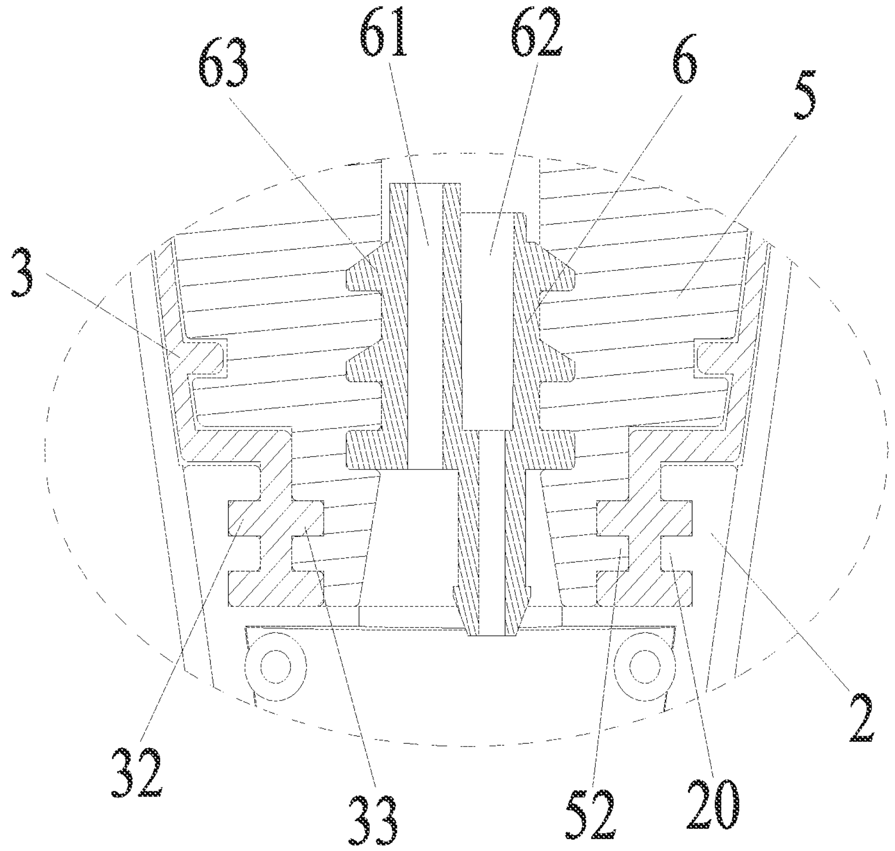
FIG. 4 is a local amplified diagram of a part B in FIG. 3.

As shown in FIG. 2 to FIG. 4, a vibrating body 4 is arranged in the silica gel inner sleeve 3, the top of the vibrating body 4 is fixed at the top of the silica gel inner sleeve 3, a vibrating silica gel sleeve 5 is covered outside the vibrating body 4, the vibrating silica gel sleeve 5 is in gap connection with the vibrating body 4, a bottom of the vibrating silica gel sleeve 5 is in sealing connection with a bottom of the silica gel inner sleeve 3, and an air inlet and outlet channel 51 is arranged in a center of the vibrating silica gel sleeve 5. An air locking member 6 is arranged at a bottom of the air inlet and outlet channel 51, a wire hole 61 and an air hole 62 are formed in the air locking member 6, the wire hole 61 is used for a wire of the vibrating body 4 to pass through and sealed by glue, and the air hole 62 is connected to an air pump 21; when gas does not enter into the air pump 21, the vibrating silica gel sleeve 5 is adhered to the inner wall of the silica gel inner sleeve 3; and when gas enters into the air pump 21, the silica gel inner sleeve 3 is opened by the gas, so an air chamber 8 is formed between the silica gel inner sleeve 3 and the vibrating silica gel sleeve 5.

Preferably, the vibrating body 4 includes a vibrating motor 41 as well as an upper cover sleeve 42 and a lower cover sleeve 43 that are arranged on a periphery of the vibrating motor 41, the upper cover sleeve 42 is fixedly connected to the lower cover sleeve 43, a top of the upper cover sleeve 42 is fixedly connected to the silica gel inner sleeve 3, and the lower cover sleeve 43 is inserted into the air inlet and outlet channel 51 and movably connected to the vibrating silica gel sleeve 5. In this embodiment, the upper cover sleeve 42 is provided with a slot 44, a protrusion portion 31 that fits with the slot 44 is arranged at the top of the silica gel inner sleeve 3, the protrusion portion 31 is clamped in the slot 44 to achieve the fixed connection between the upper cover sleeve 42 and the silica gel inner sleeve 3, and the protrusion portion 31 and the slot 44 are sealed through glue. When the silica gel inner sleeve 3 swells by blowing, the vibrating body 4 always vibrates at the top of the silica gel inner sleeve 3 no matter how much the silica gel inner sleeve 3 is opened by the gas, thereby solving gas separation force and not reducing the vibration force of the vibrating body 4.

The bottom of the vibrating silica gel sleeve 5 and the bottom of the silica gel inner sleeve 3 are sealed through the glue. In this embodiment, a first convex-concave portion 32 is arranged on an outer wall of the bottom of the silica gel inner sleeve 3, a second convex-concave portion 33 is arranged on an inner wall of the bottom of the silica gel inner sleeve 3, a first concave-convex portion 20 is arranged on an inner wall of the top of the inner shell 2, the first concave-convex portion 20 is in fit connection with the first convex-concave portion 32, a second concave-convex portion 52 is arranged on an outer wall of the bottom of the vibrating silica gel sleeve 5, and the second concave-convex portion 52 is in fit connection with the second convex-concave portion 33. The fixed connection between the silica gel inner sleeve 3 and the inner shell 2 and between the silica gel inner sleeve 3 and the vibrating silica gel sleeve 5 is achieved through a continuous convex-concave fit structure. Since the silica gel inner sleeve 3 will swell when gas enters into the silica gel inner sleeve 3, at this time, a crack may exist at the convex-concave fit gap, resulting in air leakage. In the present disclosure, the part that the concave-convex portion 20 fits with the first convex-concave portion 32 and the part that the second concave-convex portion 52 fits with the second convex-concave portion 33 are all in sealing connection through the glue, so as to not only ensure the connecting reliability, but also prevent the air leakage.

A barbed protrusion 63 is arranged outside the air locking member 6, the protrusion 63 is clamped in the vibrating silica gel sleeve 5 to achieve the fixed connection between the protrusion 63 and the vibrating silica gel sleeve 5, and the protrusion 63 and the vibrating silica gel sleeve 5 are sealed through the glue, so as to prevent the air leaking from the periphery of the air locking member 6. After the wire of the vibrating body 4 passes through the wire hole 61, the glue is filled in the wire hole 61 for sealing, so as to prevent air leakage caused by the wire passing during the air intake, and ensure the airtightness in the silica gel inner sleeve 3; and the silica gel inner sleeve 3 and the silica gel jacket 1 can keep the swelling state for a long time.

The inner shell 2 is made of hard materials and two-half buckling type, for easy installation of components in the inner shell 2. An air pump 21 is arranged in the inner shell 2, the air pump 21 is connected to one of a T-joint 22, the other two of the T-joint 22 are respectively connected to the air hole 62 of the air locking member 6 and an electromagnetic valve 23, and the electromagnetic valve 23 is respectively connected to the air pump 21 and the air inlet and outlet hole 12. A keyboard 24 is installed at the bottom of the inner shell 2, and the bottom of the silica gel jacket 1 is provided with a through hole 14, so that the keyboard 24 is exposed outside the through hole 14, and users can control the keys through the keyboard 24. A rechargeable battery 25, a charging panel 26 and a main control circuit board 27 are also arranged in the inner shell 2, and the main control circuit board 27 is arranged correspondingly to the keyboard 24. The hard inner shell 2 and the silica gel inner sleeve 3 connected to the inner shell 2 are arranged in the silica gel jacket 1, and the inner shell 2 provides an installation space for components and provides support for the silica gel inner sleeve 3.

Figure 5:
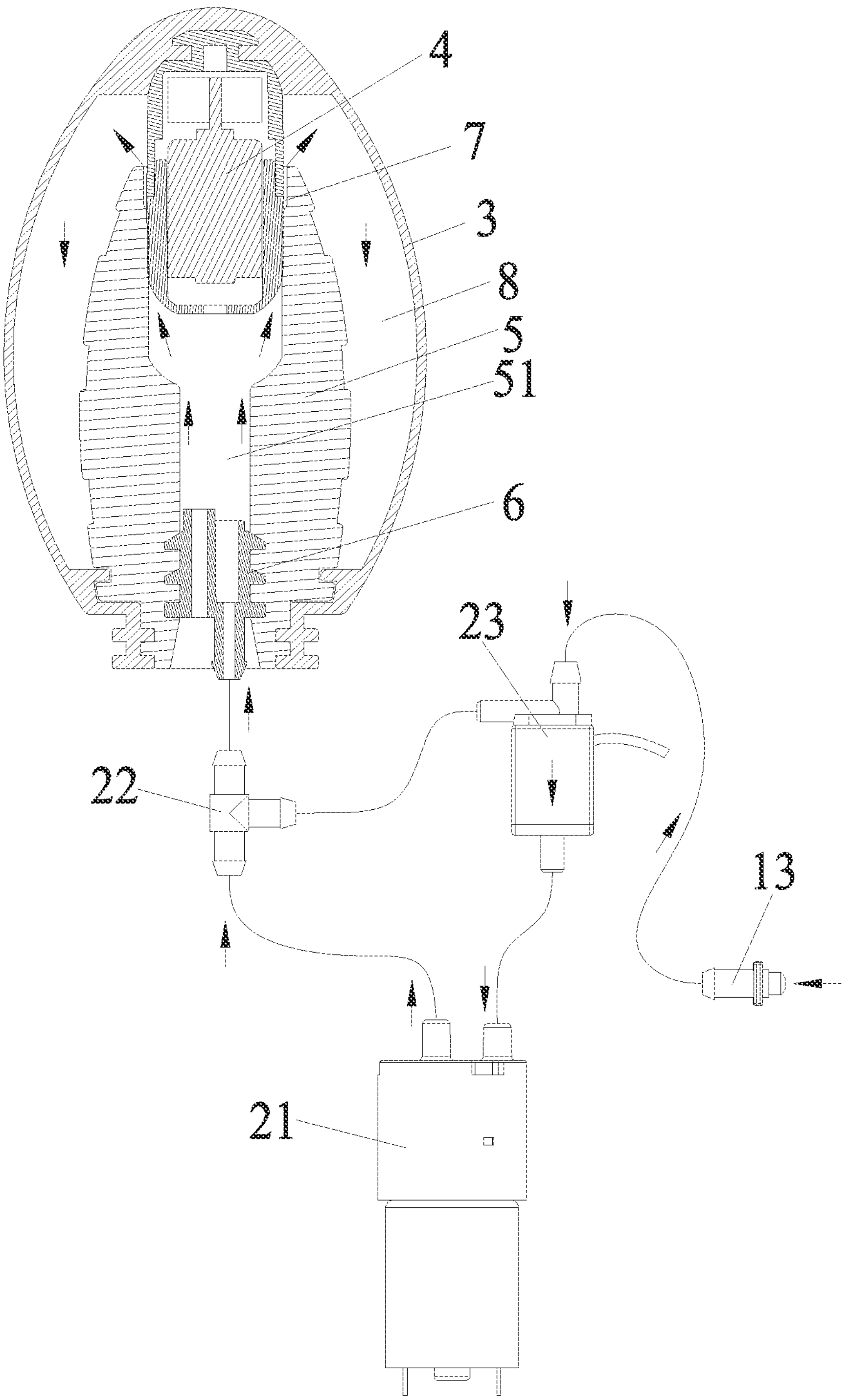
FIG. 5 is an air inlet schematic diagram of a massager capable of swelling through vibration in the present disclosure.

As shown in FIG. 5, which is an air inlet and swelling process of the massager in the present disclosure: the air pump 21 pumps external gas into the air pump 21 through the air inlet and outlet hole 12, and then the external gas enters into the air hole 62 of the air locking member 6 through the T-joint 22, so the gas enters into the air inlet and outlet channel 51 of the vibrating silica gel sleeve 5. Since a gap 7 is between the vibrating body 4 and the vibrating silica gel sleeve 5, the gas passes through the gap 7 and enters into the outer side of the vibrating silica gel sleeve 5, and a diversion groove 53 is arranged outside the vibrating silica gel sleeve 5 for gas diversion. The gas is full between the vibrating silica gel sleeve 5 and the silica gel inner sleeve 3, so that the silica gel inner sleeve 3 and the silica gel jacket 1 are opened together, and an air chamber 8 is formed between the silica gel inner sleeve 3 and the vibrating silica gel sleeve 5. Due to the sealing of the air locking member 6 and the sealing connection between the silica gel inner sleeve 3 and the vibrating silica gel sleeve 5, the gas in the air chamber 8 will not leak, and the whole silica gel inner sleeve 3 and the silica gel jacket 1 swell under the continuous filling effect of the air pump 21, so as to swell and stimulate human bodies. At the same time, the vibrating body 4 vibrates continuously at the top of the silica gel inner sleeve 3, thereby enhancing the stimulation effect and improving the sexual satisfaction. Users may control the swelling degree and the vibration strength through the keyboard 24, meanwhile, a maximum swelling volume is set, the maximum air inlet quantity is controlled by controlling the air inlet time, and when reaching the maximum quantity, the air pump 21 will stop air inlet, so as to ensure the safe use of the massager.

Figure 6:
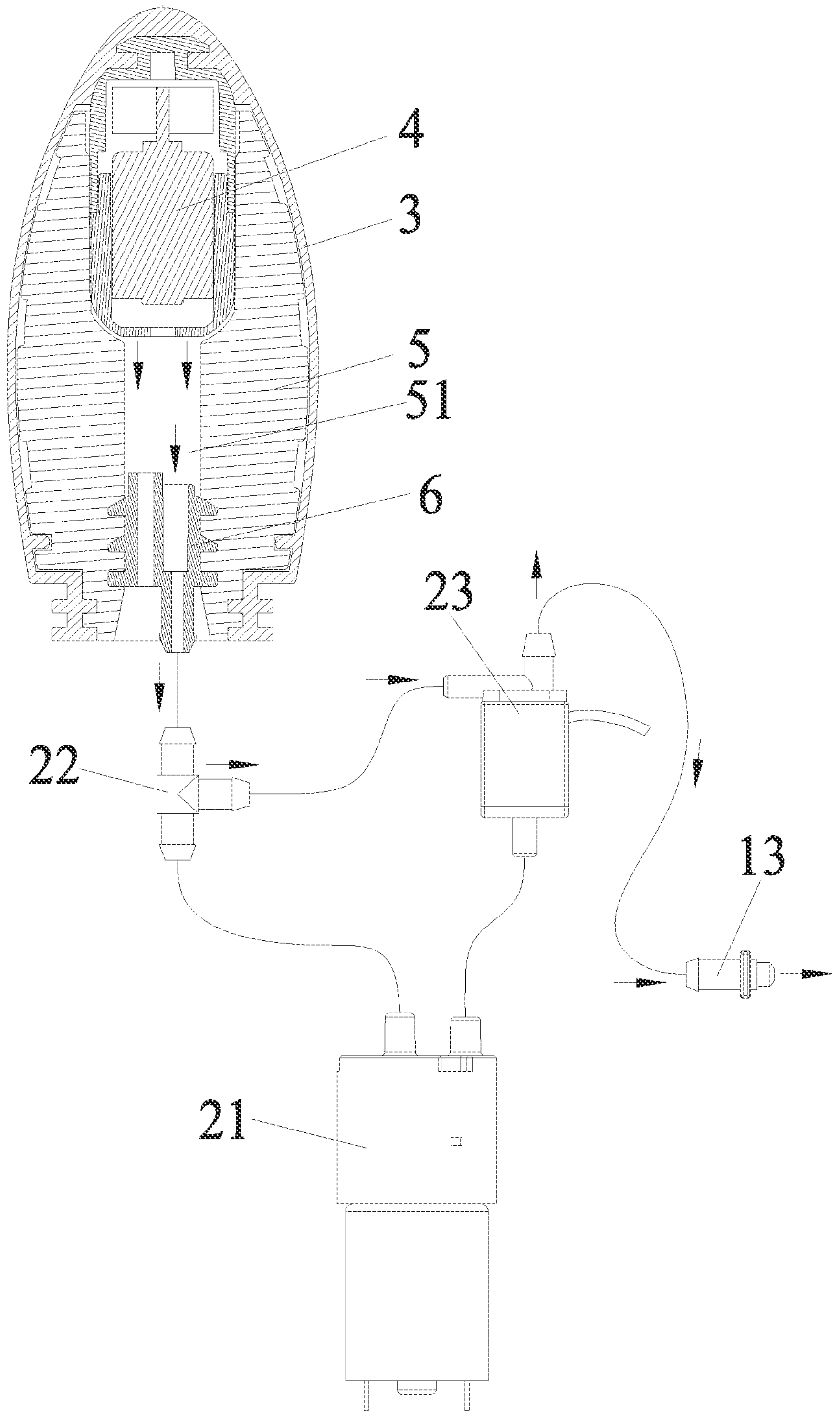
FIG. 6 is an air outlet schematic diagram of a massager capable of swelling through vibration in the present disclosure.

As shown in FIG. 6, which is an air outlet and retracting process in the present disclosure: the air pump 21 stops air inlet, and the electromagnetic valve 23 is turned on; since the gas pressure in the air chamber 8 is greater than the pressure of the external gas, the gas in the air chamber 8 is discharged from the air locking member 6, enters into the electromagnetic valve 23 through the T-joint 22, and is discharged from the massager through the connector 13 and the air inlet and outlet hole 12, and then the swelling part restores the original state.

Compared with the prior art, the massager provided by the present disclosure has the following beneficial effects:

(1) The integrated silica gel jacket 1 is adopted, so that the massager has comfort grip and better use experience;

(2) Due to adopting the silica gel jacket 1 and the silica gel inner sleeve 3 which are made of silica gel materials, the massager has great elasticity and will not deform after swelling and recovering the original state for many times;

(3) The silica gel jacket 1 is sleeved with the silica gel inner sleeve 3, the shape of the silica gel jacket 1 is consistent with that of the silica gel inner sleeve 3, and the outer wall of the silica gel inner sleeve 3 is adhered to the inner wall of the silica gel jacket 1. No matter how much the silica gel inner sleeve 3 is opened by the gas, the silica gel rupture will not be caused due to the protection of two-layer silica gel;

(4) The top of the vibrating body 4 is fixed at the top of the silica gel inner sleeve 3, so when the vibrating body 4 vibrates, the vibrating body 4 always vibrates at the top of the silica gel inner sleeve 3 no matter how much the silica gel inner sleeve 3 is opened by the gas, thereby solving gas separation force and not reducing the vibration force of the vibrating body 4;

(5) The air locking member 6 is arranged at the bottom of the air inlet and outlet channel 51, the wire hole 61 and the air hole 62 that are separated from each other are formed in the air locking member 6, the wire hole 61 is used for the wire of the vibrating body 4 to pass through and sealed by the glue, so as to prevent air leakage caused by the wire passing during the air intake, and ensure the airtightness in the silica gel inner sleeve 3; and the silica gel inner sleeve 3 and the silica gel jacket 1 can keep the swelling state for a long time; and (6) The silica gel inner sleeve 3 is sealed with the upper cover sleeve 42 of the vibrating body 4 through the glue, the silica gel inner sleeve 3 is sealed with the vibrating silica gel sleeve 5 through the glue, and the vibrating silica gel sleeve 5 is sealed with the air locking member 6 through the glue, so as to prevent air leakage when achieving reliable paste and fixing.

The above embodiments are merely used for illustrating the technical solution of the present disclosure instead of limiting it. Although the present disclosure is described in details with reference to the preferred embodiments, those skilled in the art should understand that they can make modifications or equal replacements to the technical solution recorded in the present disclosure without deviating from the spirit and scope of the technical solution of the present disclosure, which should be covered in the scope of claims in the present disclosure.

What is claimed is:

1. A massager capable of swelling through vibration, comprising an integrated silica gel jacket (1), wherein an inner shell (2) with a shape consistent to a bottom of the silica gel jacket (1) is arranged at the bottom of the silica gel jacket (1), a silica gel inner sleeve (3) is arranged at a top of the inner shell (2), an outer wall of the silica gel inner sleeve (3) is adhered to an inner wall of the silica gel jacket (1), a vibrating body (4) is arranged in the silica gel inner sleeve (3), a top of the vibrating body (4) is fixed at a top of the silica gel inner sleeve (3), a vibrating silica gel sleeve (5) is covered outside the vibrating body (4), the vibrating silica gel sleeve (5) is in gap connection with the vibrating body (4), a bottom of the vibrating silica gel sleeve (5) is in sealing connection with a bottom of the silica gel inner sleeve (3), an air inlet and outlet channel (51) is arranged in a center of the vibrating silica gel sleeve (5), an air locking member (6) is arranged at a bottom of the air inlet and outlet channel (51), a wire hole (61) and an air hole (62) are formed in the air locking member (6), the wire hole (61) is used for a wire of the vibrating body (4) to pass through and sealed by glue, and the air hole (62) is connected to an air pump (21); when gas does not enter into the air pump (21), the vibrating silica gel sleeve (5) is adhered to the inner wall of the silica gel inner sleeve (3); and when gas enters into the air pump (21), the silica gel inner sleeve (3) is opened by the gas, so an air chamber (8) is formed between the silica gel inner sleeve (3) and the vibrating silica gel sleeve (5).

2. The massager capable of swelling through vibration according to claim 1, wherein the silica gel jacket (1) and the inner shell (2) are inverted T-type, a side part (11) protruding from two sides of the silica gel jacket (1) is arranged at the bottom of the silica gel jacket (1), an air inlet and outlet hole (12) is formed in the side part (11), and a connector (13) is arranged in the air inlet and outlet hole (12).

3. The massager capable of swelling through vibration according to claim 2, wherein the air pump (21) is arranged in the inner shell (2) and connected to a T-joint (22), the T-joint (22) is respectively connected to the air locking member (6) and an electromagnetic valve (23), and the electromagnetic valve (23) is respectively connected to the air pump (21) and the connector (13).

4. The massager capable of swelling through vibration according to claim 1, wherein the vibrating body (4) includes a vibrating motor (41) as well as an upper cover sleeve (42) and a lower cover sleeve (43) that are arranged on a periphery of the vibrating motor (41), the upper cover sleeve (42) is fixedly connected to the lower cover sleeve (43), a top of the upper cover sleeve (42) is fixedly connected to the silica gel inner sleeve (3), and the lower cover sleeve (43) is inserted into the air inlet and outlet channel (51) and movably connected to the vibrating silica gel sleeve (5).

5. The massager capable of swelling through vibration according to claim 4, wherein the upper cover sleeve (42) is provided with a slot (44), a protrusion portion (31) that fits with the slot (44) is arranged at the top of the silica gel inner sleeve (3), and the protrusion portion (31) and the slot (44) are sealed through glue.

6. The massager capable of swelling through vibration according to claim 1, wherein the bottom of the vibrating silica gel sleeve (5) and the bottom of the silica gel inner sleeve (3) are sealed through the glue.

7. The massager capable of swelling through vibration according to claim 1, wherein a first convex-concave portion (32) is arranged on an outer wall of the bottom of the silica gel inner sleeve (3), a second convex-concave portion (33) is arranged on an inner wall of the bottom of the silica gel inner sleeve (3), a first concave-convex portion (20) is arranged on an inner wall of the top of the inner shell (2), the first concave-convex portion (20) is in fit connection with the first convex-concave portion (32), a second concave-convex portion (52) is arranged on an outer wall of the bottom of the vibrating silica gel sleeve (5), and the second concave-convex portion (52) is in fit connection with the second convex-concave portion (33).

8. The massager capable of swelling through vibration according to claim 1, wherein a barbed protrusion (63) is arranged outside the air locking member (6); and the protrusion (63) is clamped in the vibrating silica gel sleeve (5).

9. The massager capable of swelling through vibration according to claim 1, wherein a keyboard (24) is installed at the bottom of the inner shell (2), and a bottom of the silica gel jacket (1) is provided with a through hole (14), so that the keyboard (24) is exposed outside the through hole (14).

10. The massager capable of swelling through vibration according to claim 9, wherein a rechargeable battery (25), a charging panel (26) and a main control circuit board (27) are also arranged in the inner shell (2); and the main control circuit board (27) is arranged correspondingly to the keyboard (24).

* * * * *